(12) United States Patent
Köhler

(10) Patent No.: US 12,240,587 B2
(45) Date of Patent: Mar. 4, 2025

(54) AIRCRAFT FUSELAGE ASSEMBLY WITH A CARGO FLOOR ASSEMBLY

(71) Applicant: Airbus Operations GmbH, Hamburg (DE)

(72) Inventor: André Köhler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 230 days.

(21) Appl. No.: 17/824,119

(22) Filed: May 25, 2022

(65) Prior Publication Data

US 2022/0380018 A1 Dec. 1, 2022

(30) Foreign Application Priority Data

May 31, 2021 (DE) .......................... 102021114076.5

(51) Int. Cl.
  *B64C 1/20* (2006.01)
  *B64C 1/12* (2006.01)
  *B64D 9/00* (2006.01)

(52) U.S. Cl.
  CPC ................. *B64C 1/20* (2013.01); *B64C 1/12* (2013.01); *B64D 9/003* (2013.01); *B64D 2009/006* (2013.01)

(58) Field of Classification Search
  CPC ... B64C 1/18; B64C 1/20; B64D 9/003; E04F 15/02452; E04F 15/02494
  USPC ............... 52/506.05, 263; 410/77; 248/188.2
  See application file for complete search history.

(56) References Cited

U.S. PATENT DOCUMENTS

| | | | | |
|---|---|---|---|---|
| 4,578,910 | A * | 4/1986 | Germeroth | ........ E04F 15/02452 24/DIG. 54 |
| 7,073,994 | B2 | 7/2006 | Huber et al. | |
| 9,038,947 | B2 | 5/2015 | Huber et al. | |
| 10,689,114 | B2 | 6/2020 | Huber et al. | |
| 2004/0218989 | A1* | 11/2004 | Huber | ....................... B64C 1/20 410/92 |

(Continued)

FOREIGN PATENT DOCUMENTS

DE 102015104230 A1 9/2016
EP 1473222 A1 11/2004

(Continued)

OTHER PUBLICATIONS

German Search Report; priority document.

*Primary Examiner* — Richard Green
*Assistant Examiner* — Nevena Aleksic
(74) *Attorney, Agent, or Firm* — Greer, Burns & Crain, Ltd.

(57) ABSTRACT

An aircraft fuselage assembly includes a primary structure with first and second rows of support elements extending parallel to a longitudinal axis and into an interior space of the fuselage where they have a free end. The free ends of the first and second rows are spaced from one another to from a free space below a common plane of the free ends and extending to the primary structure. A cargo floor assembly with at least one first cargo floor element is fixedly connected to the free ends of the first row in the common plane and at least one second cargo floor element fixedly connected to the free ends of the second row in the common plane. At least one central cargo floor element is arranged between the first and second lines and is releasably connected to the support elements of the first and second rows.

13 Claims, 4 Drawing Sheets

(56) References Cited

U.S. PATENT DOCUMENTS

| | | | |
|---|---|---|---|
| 2006/0231681 A1* | 10/2006 | Huber | B64C 1/18 |
| | | | 244/119 |
| 2008/0217478 A1 | 9/2008 | Keeler et al. | |
| 2020/0086967 A1* | 3/2020 | Tiryaki | B64C 1/20 |
| 2020/0223529 A1* | 7/2020 | Spry | B64D 9/003 |

FOREIGN PATENT DOCUMENTS

| | | | | |
|---|---|---|---|---|
| WO | 2005012083 A1 | 2/2005 | | |
| WO | WO-2013135855 A1 * | 9/2013 | | B64C 1/18 |

* cited by examiner

AIRCRAFT FUSELAGE ASSEMBLY WITH A CARGO FLOOR ASSEMBLY

CROSS-REFERENCES TO RELATED APPLICATIONS

This application claims the benefit of the German patent application No. 102021114076.5 filed on May 31, 2021, the entire disclosures of which are incorporated herein by way of reference.

FIELD OF THE INVENTION

The present invention relates to an aircraft fuselage assembly extending along a longitudinal axis and comprising a primary structure supporting an outer skin of the fuselage assembly, wherein the outer skin surrounds an interior space of the aircraft fuselage assembly and the primary structure is arranged on the side of the outer skin facing the interior space, wherein the aircraft fuselage assembly has a cargo floor assembly that forms a cargo floor within the interior space.

BACKGROUND OF THE INVENTION

The aircraft fuselage assembly of conventional aircraft is currently configured such that below the passenger cabin region there is provided a cargo space in which cargo can be accommodated, wherein the cargo space has a cargo floor assembly. In order to transfer the loads introduced into the cargo floor by the cargo into the structure and, in particular, the primary structure supporting the outer skin, a framework structure is usually provided under the cargo floor and is used to fixedly connect the elements of the cargo floor to the primary structure. This allows the loads introduced into the cargo floor elements due to the cargo arranged on them to be transferred directly to the primary structure.

The cargo floor assembly, in turn, can be designed in different ways. On the one hand, it is possible for the floor assembly to be designed in such a way that it is intended to accommodate baggage and therefore does not have a cargo loading system, since the individual pieces of baggage are transported into the cargo space with the aid of conveyor belts. However, a transport system in the cargo floor by means of which baggage items are moved is not provided here. In addition, in this case individual portions of the cargo space can be separated from each other by flexible nets to prevent the individual baggage items from moving along the cargo space during the flight.

Alternatively, it may be envisaged that the cargo floor assembly is configured to accommodate so-called ULDs (Unit Load Devices: including cargo containers and pallets). In this case, a cargo loading system is required to move the ULDs within the cargo space.

Proceeding from a cargo floor intended for baggage, in prior art aircraft fuselage assemblies a cargo loading system can only be retrofitted, however, with great effort and thus the cargo space can only be converted to accommodate cargo containers in a very time-consuming manner. This is because cargo floor elements that are connected to the primary structure via the framework structure would first have to be removed, but this is only possible with great difficulty, since elements that are part of a load path would have to be separated from each other here, and then replaced with cargo floor elements that comprise the cargo loading system or are at least suitable for use with such a system.

At the same time, due to recent strong fluctuations in passenger numbers and seasonal and fleet-related changes in requirements, it is often desirable to be able to use the cargo space of a passenger aircraft more flexibly than has previously been the case. In particular, it is increasingly of benefit if at least parts of a cargo space are not to be used permanently only for baggage or only for cargo containers, but if conversion from one use to the other is possible quickly and easily. However, the latter is currently prevented due to the connection of the cargo floor elements to the primary structure via framework elements below the cargo floor and, in particular, below the central region of the cargo floor.

SUMMARY OF THE INVENTION

Therefore, it is an object of the present invention to provide an aircraft fuselage assembly which allows the cargo floor assembly to be adapted to different types of use in a simple manner and in the most time-saving manner possible without having to adapt the primary structure.

The aircraft fuselage assembly according to the invention extends along a longitudinal axis and comprises a primary structure supporting an outer skin of the fuselage assembly, wherein the outer skin surrounds an interior of the aircraft fuselage assembly and the primary structure is arranged on the side of the outer skin facing the interior. Further provided are first and second rows of support elements, wherein the first and second rows extend parallel to the longitudinal axis, wherein the support elements are connected to the primary structure and extend away from the outer skin into the interior space, and wherein they have a free end arranged remotely from the outer skin. The free ends of the support elements of the first row extend along a first line, and the free ends of the support elements of the second row extend along a second line, wherein the lines are spaced apart from each other. Here, the free ends of the support elements are arranged in a common plane that is horizontal when an aircraft having the aircraft fuselage assembly is on the ground with its landing gear. A free space is formed between the first row and the second row of support elements below the common plane and extends up to the primary structure so that the free space is free of horizontally extending parts of the primary structure, which are generally formed as transverse beams.

Furthermore, the fuselage assembly according to the invention has a cargo floor assembly that forms a cargo floor within the interior space, wherein the cargo floor assembly has at least one first cargo floor element extending from the first line in the common plane towards the primary structure and being fixedly connected thereto and to the support elements of the first row. In addition, the cargo floor assembly comprises at least one second cargo floor element extending from the second line in the common plane towards the primary structure and being fixedly connected thereto and to the support elements of the second row. Further, there is provided at least one central cargo floor element arranged between the first line and the second line and releasably connected to the support elements of the first row and the second row. Thus, the at least one first cargo floor element and the at least one second cargo floor element extend from the rows of support elements sideways away from the longitudinal axis towards the primary structure and thus towards the outer skin, and the space between the two rows is closed by the at least one central cargo floor element.

Further, the at least one central cargo floor element can be removed without affecting the stability of the aircraft fuselage assembly.

Lastly, in the aircraft fuselage structure according to the invention, the support elements and the at least one first and the at least one second cargo floor elements are designed and arranged such that loads emanating from the central cargo floor element are transferred into the primary structure by the support elements and the at least one first and the at least one second cargo floor element.

The aircraft fuselage structure according to the invention is distinguished in that it extends along a longitudinal axis and comprises a primary structure which provides the stability of the aircraft fuselage structure and comprises, inter alia, the formers and stringers. This primary structure supports the outer skin of the aircraft fuselage assembly and, in particular, the sheeting that forms it. Furthermore, in the fuselage assembly according to the invention, support elements, also called brackets, are provided which are connected to the primary structure and extend away therefrom into an interior space surrounded by the fuselage assembly. At least a first row and a second row of support elements are provided, wherein the rows extend parallel to the longitudinal axis such that free ends of the support elements form a first and a second line. The two lines then likewise extend parallel to the longitudinal axis, but are spaced apart from each other. In addition, they extend in a common plane which then runs horizontally when an aircraft having the fuselage assembly is on the ground with its landing gear.

In accordance with the invention, the aircraft fuselage assembly is furthermore designed in such a way that between the two rows of support elements and below the common plane in which the two lines defined by the free ends of the support elements run, there is a free space which extends up to the primary structure, so that the free space is free of the primary structure supporting the outer skin. This free space is thus specifically not traversed by further structural elements that form the primary structure and thus contribute to the stability of the fuselage assembly, such as a framework structure.

Lastly, the aircraft fuselage structure according to the invention has a cargo floor assembly arranged in the region of the fuselage assembly in which the cargo space is formed, i.e., preferably below the actual passenger cabin. In accordance with the invention, the cargo floor assembly comprises at least one first cargo floor element running from the first line in the common plane towards the primary structure, and thus likewise running horizontally. The at least one first cargo floor element is fixedly connected both to the primary structure and to the support elements, such that the at least one first cargo floor element is part of a load path between the free ends of the support elements and the primary structure. Similarly, the cargo floor assembly has at least one second cargo floor element extending from the second line likewise horizontally in the common plane towards the primary structure, wherein the second cargo floor element is also fixedly connected both to the free ends of the support elements and to the primary structure to form a fixed load path here as well.

In a preferred embodiment, a plurality of first cargo floor elements are provided, arranged successively along the longitudinal axis in the common plane, wherein the first cargo floor elements extend from the first line in the common plane towards the primary structure and are fixedly connected thereto and to the support elements of the first row. Alternatively or additionally, there are preferably provided a plurality of second cargo floor elements arranged successively along the longitudinal axis in the common plane and extending from the second line in the common plane towards the primary structure, wherein the second cargo floor elements are fixedly connected to the primary structure and the support elements of the second row. Thus, it is possible within the scope of the invention that a plurality of first and second cargo floor elements are provided, which are arranged successively along the longitudinal axis between the first and second lines, respectively, on the one hand and the primary structure on the other hand.

Lastly, in accordance with the invention, at least one central cargo floor element and preferably a plurality of central cargo floor elements are provided between the first line and the second line, which are releasably connected to the support elements so that they can be removed without great effort. In accordance with the invention, this is possible because the central cargo floor elements are not part of a load path and, in particular, do not contribute to the stability of the aircraft fuselage assembly.

In accordance with the invention, the support elements and the at least one first and the at least one second cargo floor element are designed and arranged such that loads emanating from the central cargo floor element are transferred into the primary structure by the support elements and the at least one first and the at least one second cargo floor element.

This is achieved in that when the aircraft fuselage assembly according to the invention is viewed in cross-section, the first line along which the free ends of the support elements of the first row extend and along which the central cargo floor elements are connected to the support elements, the line along which the first cargo floor elements are connected to the primary structure, and the connection between the support elements of the first row and of the primary structure form a first triangle. Quite analogously, the second line along which the free ends of the support elements of the second row are arranged, the line along which the second cargo floor elements are connected to the primary structure, and the line along which the support elements of the second row are connected to the primary structure also form a second triangle.

Starting from the first line forming the apex of the first triangle, load paths are provided through the first cargo floor elements on the one hand and the support elements of the first row on the other hand and can be used to transfer loads to the cargo floor in the z- and y-directions and thus transversely to the longitudinal axis of the fuselage assembly. If the central cargo floor elements are releasably connected to the support elements of the first row along the first line, loads acting in the y- and z-directions on the central cargo elements are also transferred to the primary structure via the described first triangle.

A very analogous effect is achieved for the second triangle, in which the second cargo floor elements and the support elements of the second row also form rigid load paths for loads in the y- and z-directions towards the primary structure that emanate from the cargo floor elements and, in particular, the central cargo floor element or elements.

In addition, the fixed connection between the free ends of the support elements of the first row along the first line and the first cargo floor element or elements, as well as the fixed connection between the first cargo floor element or elements and the primary structure, ensures that loads acting on the central cargo floor elements in the x-direction and thus in the longitudinal direction of the aircraft fuselage assembly can also be transferred to the primary structure.

The various fixed connections along the first line between the first cargo floor elements and the free ends of the support elements of the first row, between the first cargo floor elements and the primary structure, and between the support elements of the first row and the primary structure are set up and designed in such a way that they can also transmit the loads that occur in each case. The same applies to the fixed connections in the second triangle.

Since the loads emanating from the central cargo floor element or elements in the x-, y- and z-directions are introduced into the primary structure via the described triangles, it is not necessary to provide a framework structure below the central cargo elements to support loads, and in order to replace the central cargo floor elements it is merely necessary to detach them from the free ends of the support elements of the first and second rows along the first and second lines. Further connections forming part of a load path need not be provided on the central cargo floor elements.

The free space therefore provided below the at least one central cargo floor element also allows the central cargo floor elements to be designed in such a way that they extend downwards away from the common plane. This allows the central cargo floor elements to be designed in a particularly flexible manner and, in particular, to contain parts of cargo loading systems or the like.

The aircraft fuselage assembly according to the invention, by allowing the central cargo floor elements to be easily replaced, since only the connections along the first and second lines are part of a load path, allows the cargo floor to be adapted to different requirements with little effort. By providing a free space below the common plane between the rows of support elements, it is further possible to accommodate elements in this region that are provided on the central cargo floor elements and that are part of a cargo loading system, for example.

As already explained, in a preferred embodiment, a plurality of central cargo floor elements can be provided, arranged successively along the longitudinal axis between the first and second lines and releasably connected to the support elements of the first and second rows.

In a preferred embodiment, each of the support elements has a first support element portion, a second support element portion and a connecting portion, wherein the free end of each of the support elements is provided at the connecting portion, wherein each support element has the support element portions extending away from the connecting portion and running, spaced apart from each other, to the primary structure so that they are connected to the primary structure in a manner spaced apart from each other in the circumferential direction about the longitudinal axis. In such an embodiment of the support elements, the support elements themselves in turn form a triangular structure as viewed in cross-section in the longitudinal direction of the aircraft fuselage structure, by means of which triangular structure it is possible for loads introduced into the connecting portion of the support elements, where the first and second lines are formed, respectively, in the y- and z-directions, to be effectively introduced into the primary structure. Thus, an additional triangular structure is formed in this preferred embodiment.

In a preferred embodiment of the present invention, a continuous first beam is provided along the first row and is connected to the free ends of the support elements of the first row, with the at least one or the plurality of first cargo floor elements being fixedly connected to the first beam. Additionally or supplementally, a continuous second beam can be provided along the second row and is connected to the free ends of the support elements of the second row, with at least one or the plurality of second cargo floor elements being fixedly connected to the second beam. With the aid of the beams, it is achieved that loads acting on the central cargo floor elements in the x-direction of the aircraft fuselage assembly, i.e., in its longitudinal direction parallel to the longitudinal axis, are introduced into the primary structure over the entire length of the rows of support elements via the first and/or second cargo floor elements. It is also possible that the free ends of the support elements of the first row are provided with first adapter plates extending parallel to the common plane, wherein each of the first adapter plates is fixedly connected to the at least one or to one of the plurality of first cargo floor elements. Further, the free ends of the support elements of the second row can be provided with second adapter plates extending parallel to the common plane, wherein each of the second adapter plates is fixedly connected to the at least one or to one of the plurality of second cargo floor elements, wherein the first and second adapter plates have connection elements configured to be releasably connected to the at least one or two adjacent ones of the central cargo floor elements.

On the one hand, the adapter plates serve to releasably connect the central cargo floor elements to the free ends of the support elements of the first and second rows. Furthermore, the first and second cargo floor elements are also connected to the free ends of the support elements of the first and second rows respectively via the adapter plates. In addition, the adapter plates can be used to couple a cargo loading system to the support elements, if required.

In another preferred embodiment, the at least one central cargo floor element or at least one of the plurality of central cargo floor elements has a through-opening, wherein a cover element is provided that is insertable into the through-opening to close the through-opening, wherein the cover element is releasably connectable to the at least one central cargo floor element. With the help of the through-opening and the cover element closing it, access to the free space below the central cargo floor element can be achieved in a simple manner.

In a further preferred manner, the at least one central cargo floor element or at least one of the plurality of central cargo floor elements has a first portion, a second portion, and a third portion, wherein the surface of the first portion and of the third portion facing away from the primary structure run in the common plane when the central cargo floor element is assembled, wherein the surface of the second portion facing away from the primary structure runs parallel to the common plane and offset from the common plane towards the primary structure in the assembled state of the central cargo floor element, wherein the through-opening is arranged in the second portion, and wherein the first portion is releasably connected to support elements of the first row, and the third portion is releasably connected to support elements of the second row.

In this embodiment, the central cargo floor element or elements is stepped, wherein the second, middle portion is offset downwards into the free space relative to the first and third portions. Due to the free space below the central cargo floor element or the central cargo floor elements, such a stepped design can be easily realized. It allows additional systems to be accommodated in the region of the second middle portion, such as cargo loading system elements for automatic loading and locking of the ULDs or conveyors for pieces of baggage.

Furthermore, it is preferred if, in addition to the cover elements that can be inserted into the through-opening, one or more supply unit elements with one or more supply connections are additionally provided, wherein the supply unit element is insertable into the through-opening to close it, wherein the supply unit element is releasably connectable to the at least one central cargo floor element, and wherein, when the supply unit element is inserted into the through-opening, the supply connections are arranged on the side of the supply unit element facing away from the primary structure. In this way, it is possible for the cover element to be simply replaced by a component that has supply connections, without having to perform major conversions in the region of the cargo floor.

Alternatively or in addition to the cover element and the supply unit element, at least one conveyor unit element can be provided with an engagement element assembly configured to be engaged by a conveyor device for conveying cargo items therewith, wherein the supply unit element is insertable into the through-opening for closing the through-opening, wherein the conveyor unit element is releasably connectable to the at least one central cargo floor element, and wherein, when the conveyor unit element is inserted into the through-opening, the engagement element assembly is arranged on the side of the conveyor unit element facing away from the primary structure.

With the aid of the conveyor unit element, which can be inserted into the through-opening, the central cargo floor element can be designed in a simple manner so that a conveyor device with which, for example, cargo items can be conveyed along the cargo floor can move along the cargo floor in such a way that it engages with the engagement element assembly. Also in this case, beyond replacing the cover element or the supply unit element with the conveyor unit element, no further elaborate conversion measures are required to be performed on the cargo floor in order to install the conveyor device for cargo items. In a further preferred manner, a conveyor device is provided which is configured to engage with the engagement element assembly to convey cargo items along the longitudinal axis.

In a further preferred embodiment, first engagement elements for engagement with cargo items can be fastened to the primary structure on the side of the at least one first cargo floor element or the plurality of first cargo floor elements facing away from the first line, wherein second engagement elements for engagement with cargo items are fastened to the primary structure on the side of the at least one second cargo floor element or the plurality of second cargo floor elements facing away from the second line. These engagement elements serve to secure cargo items and, in particular, cargo containers to the cargo floor of the aircraft fuselage assembly according to the invention.

In a further preferred manner, a first rail can be provided along the first row and is provided with guide elements, preferably rollers, for cargo items, while a second rail is provided along the second row and is provided with guide elements, preferably rollers, for cargo items. This makes it possible to move bulky cargo items along the cargo floor.

BRIEF DESCRIPTION OF THE DRAWINGS

In the following, the present invention is explained with reference to a drawing showing only preferred exemplary embodiments of the present invention, in which.

DETAILED DESCRIPTION OF THE PREFERRED EMBODIMENTS

Figure 1:
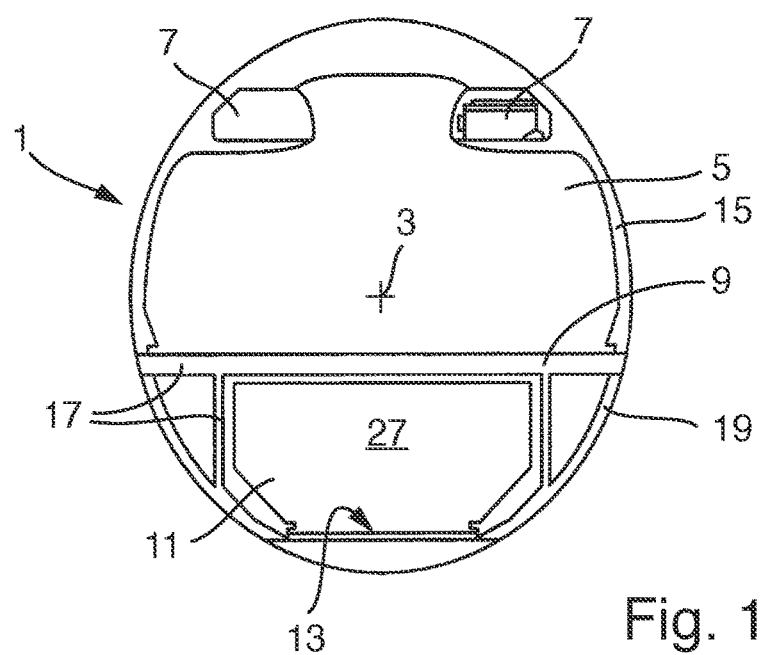
FIG. 1 shows a schematic cross-sectional view of an exemplary embodiment of an aircraft fuselage assembly according to the invention.

FIG. 1 shows an exemplary embodiment of an aircraft fuselage assembly according to the invention in cross-section, as can be used in a conventional passenger aircraft, wherein the aircraft fuselage assembly 1 extends along a longitudinal axis 3. Here, the aircraft fuselage assembly 1 has a passenger cabin 5, in the upper region of which there are provided baggage compartments 7 and which is separated by a floor 9 from a cargo space 11 arranged therebelow. The cargo space 11, in turn, has a cargo floor assembly 13 in the lower region, which, according to the exemplary embodiments shown below, is flexibly designed in such a way that the cargo space 11 can be easily adapted to different forms of cargo.

Figure 2:
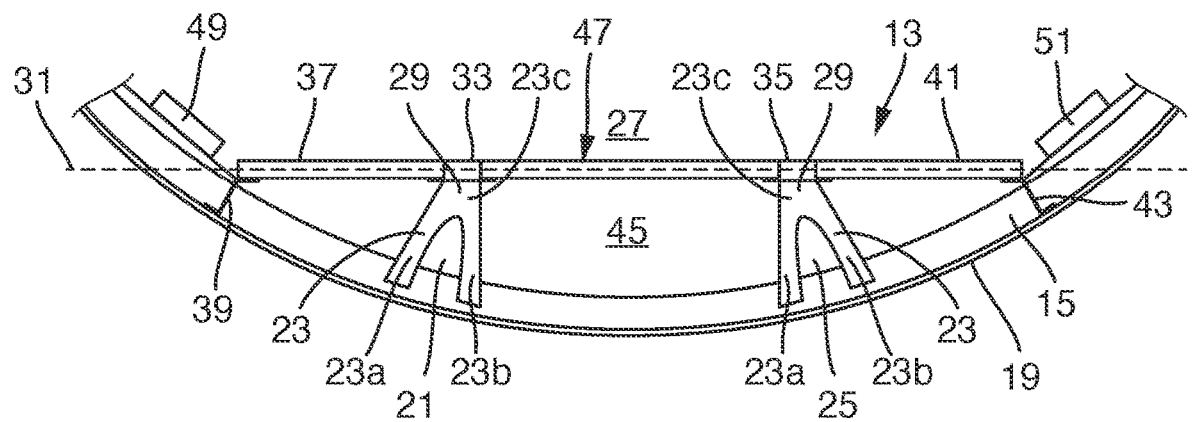
FIG. 2 shows an enlarged cross-sectional view of a first exemplary embodiment of an aircraft fuselage assembly according to the invention.

As can be further seen from FIGS. 1 and 2, the aircraft fuselage assembly 1 according to the exemplary embodiments has a primary structure comprising, inter alia, formers 15 extending circumferentially about the longitudinal axis 3 and support elements 17 extending through the aircraft fuselage assembly 1. In addition, the primary structure can also have stringers extending in the direction of the longitudinal axis 3, but these are not shown in the figures. In this case, the primary structure is designed to support the loads acting on the aircraft fuselage assembly 1 and also to support an outer skin 19 of the fuselage assembly 1 in the form of a sheeting.

As can be further seen from FIGS. 2 to 6, the primary structure has a first row 21 of support elements 23 and a second row 25 of support elements 23, wherein the support elements 23 extend inwardly away from the outer skin 19 into the interior space 27, which contains the passenger cabin 5 and the cargo space 11 and which is surrounded by the outer skin 19. Here, the support elements 23 are connected at a first end to the primary structure and, in the present exemplary embodiments, to the formers 15. The support elements 23 extend here in the direction of the interior space 27 and also have a free end 29. These free ends 29 are arranged in a generally horizontally running common plane 31, wherein the free ends 29 of the support elements 23 of the first row 21 are arranged along a first line and the free ends 29 of the support elements 23 of the second row 25 are arranged along a second line. These two lines run in the common horizontal plane 31, and this plane runs horizontally, in particular when an aircraft provided with the aircraft fuselage assembly 1 according to the invention stands with its landing gear on a horizontally running ground surface.

In the preferred exemplary embodiments illustrated herein, each of the support elements 23 has a first support element portion 23*a*, a second support element portion 23*b*, and a connecting portion 23*c*, wherein the free end 29 of the support elements 23 is provided at the connecting portion 23*c*. The support elements 23 are further structured such that the two support element portions 23*a*, 23*b* extend away from the connecting portion 23*c* and run, spaced apart from each other, to the primary structure in the form of the formers 15. They are connected here to the formers 15, specifically in a manner spaced apart from each other as seen in the circumferential direction about the longitudinal axis 3.

As can be seen further in FIG. 2, at the free ends 29 of the support elements 23 of the first row 21 and thus at their connecting portions 23*c*, a first beam 33 is attached which extends along the first line in the common plane 31, wherein this first beam 33 is formed either in one piece or in segments, but the segments are then fixedly connected to each other, so that the first beam 33 is formed continuously. Similarly, at the free ends 29 of the support elements 23 of the second row 25, a second beam 35 is provided which extends along the second line and also in the common plane 31. This beam 35 can also be formed either in one piece or in segments, but with connected segments so that here, too, the beam 35 is formed continuously and loads introduced at points therein are distributed over the entire length of the beam 35.

As can be seen further from FIG. 2, first cargo floor elements 37 are arranged successively in the horizontal plane 31 on the first beam 33 at the free ends 29 of the support elements 23 of the first row 21 as seen along the longitudinal axis 3, wherein the first cargo floor elements 37 extend between the first beam 33 and the primary structure formed by the formers 15. The first cargo floor elements 37 are fixedly connected here both to the first beam 33 and to the primary structure in the form of the formers 15. For this purpose, first fastening elements 39 are provided on the formers 15 in the lateral region, via which the first cargo floor elements 37 are connected to the formers 15 and the outer skin 19 (including stringers). Since the first cargo floor elements 37 are fixedly connected to the first beam 33, they are also fixedly connected to the free ends 29 of the support elements 23 of the first row 21. As a result, the first cargo floor elements 37 create a load path between the free ends 29 of the support elements 23 of the first row 21 on the one hand and the primary structure in the form of the formers 15 on the other hand. The first cargo floor elements 37 are therefore fixedly connected both to the lateral primary structure in the form of the formers 15 and to the first beam 33, because the first cargo floor elements 37 are part of the structure of the aircraft fuselage 1 and contribute to its stability. In particular, the fixed connections can be riveted connections. In particular, they are connections that preferably cannot be easily released by means of conventional tools.

As can be seen further from FIG. 2, second cargo floor elements 41 arranged successively, as seen along the longitudinal axis 3, extend between the second beam 35 at the free ends 29 of the support elements 23 of the second row 25 and the lateral region of the primary structure in the form of the formers 15. The second cargo floor elements 41 also run in the common plane 31 and are fixedly connected both to the second beam 35 and to the formers 15 and the outer skin 19, for example via stringers, and thus to the primary structure, wherein second fastening elements 43 are provided between the formers 15 and the second cargo floor elements 41.

Since also in this case the second cargo floor elements 41 are fixedly connected to the second beam 35 and thus are fixedly connected to the free ends 29 of the support elements 23 of the second row 25, a load path is created between the free ends 29 at the second row 25 and the lateral region of the primary structure. Also, in the case of the second cargo floor elements 41, connections are provided between them and the second beam 35 and between the second cargo floor elements 41 and the primary structure, the connections being fixed and thus preferably not readily releasable with the aid of conventional tools, since these connections are essential for the stability of the aircraft fuselage structure 1.

Since the first and second cargo floor elements 37, 41 are each fixedly connected to the first and second beams 33, 35, respectively, and to the lateral portion of the primary structure, loads acting on the beams 33, 35 in the x-direction of the aircraft, that is to say, parallel to the longitudinal axis 3, are introduced into the primary structure. It is not necessary for elements of the primary structure to extend completely through the interior 27 at the level of the common plane 31 to support such loads.

Furthermore, it can be seen in FIG. 2 that a free space 45 is provided below the common plane 31 and is free of elements of the primary structure, extending here up to the formers 15 forming the primary structure.

Furthermore, it can be seen in FIG. 2 that a plurality of central cargo floor elements 47 are provided between the first beam 33 and the second beam 35, successively as seen along the longitudinal direction 3, and also extend in the horizontal common plane 31, so that the free space 45 is provided below the central cargo floor elements 47.

The central cargo floor elements 47 are releasably connected to both the first support 33 and the second support 35 so that they can be easily removed by attending personnel. In particular, the releasable connection between the central cargo floor elements 47 and the beams 33, 35 can be in the form of a screw connection using bolts that are screwed into the beams 33, 35. However, other releasable connections are also conceivable. Due to the releasable connection between the central cargo floor elements 47 and the supports 33, 35, there is thus also a releasable connection between the central cargo floor elements 47 and the free ends 29 of the support elements 23.

The central cargo floor elements 47 are not part of a load path within the structure of the aircraft fuselage assembly 1 according to the invention, and since they are releasably connected to the beams 33, 35, they can be easily removed or replaced with alternatively formed central cargo floor elements.

In the exemplary embodiment shown in FIG. 2, the central cargo floor elements 47 are formed as simple panels so that they form part of a simple cargo floor formed without a cargo loading system.

Lastly, it can also be seen from FIG. 2 that in this exemplary embodiment, as in the other exemplary embodiments described below, a plurality of first engagement elements 49 are provided on the side of the first cargo floor elements 37 facing away from the first line and thus the first beam 33, the first engagement elements 49 being fixedly connected to the primary structure in the form of the formers 15 and being designed to engage with cargo nets or cargo loading system elements for holding cargo items arranged on the cargo floor. Similarly, on the side of the second cargo floor elements 41 facing away from the second line and thus the second beam 35, second engagement elements 51 are provided on the primary structure, which here are also fastened to the formers 15 and also serve to engage with and fix cargo nets or cargo loading system elements for holding cargo items arranged on the cargo floor.

Figure 7:
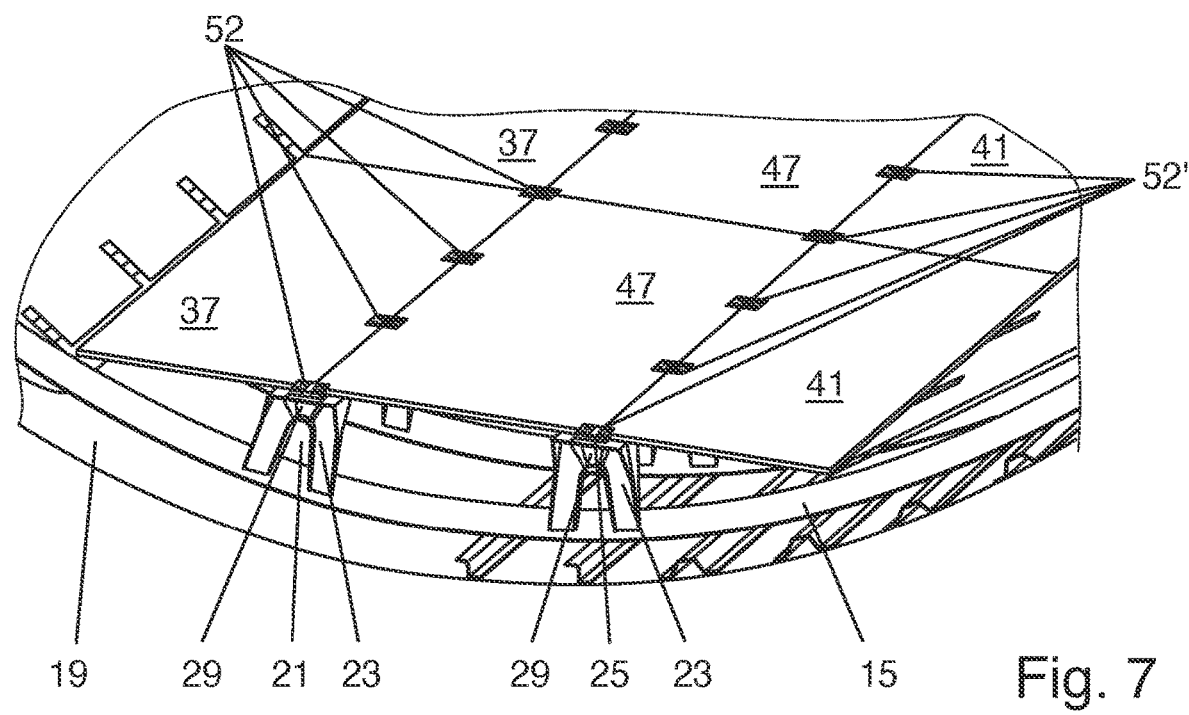
FIG. 7 shows a perspective illustration of part of a further exemplary embodiment of an aircraft fuselage assembly according to the invention.

As can be seen from FIG. 7, in all of the exemplary embodiments described herein, adapter plates 52, 52' can also be provided at the free ends 29 of the support elements 23 of the first row 21 and of the second row 25 as an alternative to the beams 33, 35 and extend parallel to the common plane 31 in which the free ends 29 of the support elements 23 are arranged. In particular, the free ends 29 of the support elements 23 of the first row 21 can be provided with first adapter plates 52, wherein each of the first adapter plates 52 is fixedly connected to two of the first cargo floor elements 37. Further, the free ends of the support elements 23 of the second row 25 can be provided with second adapter plates 52', wherein each of the second adapter plates 52' is fixedly connected to two of the second cargo floor elements 41, wherein the first and second adapter plates 52, 52' have connection elements designed to be releasably connected to two adjacent central cargo floor elements 47.

Figure 3:
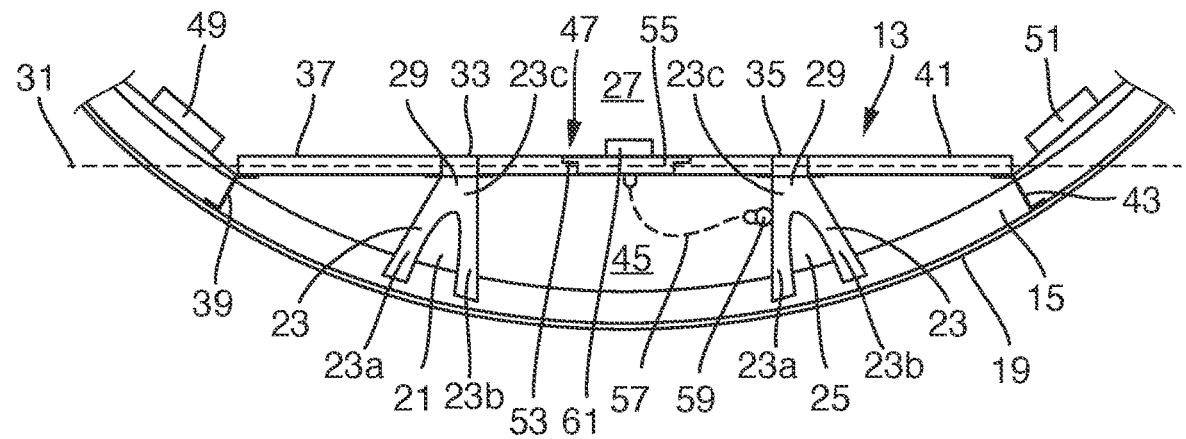
FIG. 3 shows an enlarged cross-sectional view of a second exemplary embodiment of an aircraft fuselage assembly according to the invention.

The adapter plates 52, 52' then serve on the one hand to releasably connect the central cargo floor elements 47 to the free ends 29 of the support elements 23 of the first and second rows 21, 25. Furthermore, the first and second cargo floor elements 37 are also connected to the free ends 29 of the support elements 23 of the first and second rows 21, 25, respectively, via the adapter plates. Additionally, the adapter plates can be used to couple a cargo loading system to the support elements 23, if required. FIG. 3 shows a second exemplary embodiment of an aircraft fuselage assembly 1 according to the invention, which differs from the first embodiment shown in FIG. 2 in that at least one of the central cargo floor elements 47 arranged between the supports 33, 35 has a through-opening 53 extending through this central cargo floor element 47, so that there is thus access from the interior space 27 above the common plane 31 and thus from the cargo space 11 to the free space 45 below the central cargo floor element 47. However, in the exemplary embodiment described herein, the through-opening 53 does not extend along the entire length of the central cargo floor element 47 as seen in the direction of the longitudinal axis 3, but only along a portion thereof. Furthermore, it can be seen in FIG. 3 that a cover element can be inserted into the through-opening 53 and, in the present second exemplary embodiment, is formed as a supply unit element 55 and closes the through-opening 53. Here, it can be releasably attached to the central cargo floor element 47 having the through-opening 53. Furthermore, it can be seen that the supply unit element 55 is connected to a system connection 59, provided on a support element 23 of the second row 25, via a line 57 which is connected to a supply system of the aircraft, such as a power supply. Also provided on the supply unit element 55 is a supply connection 61, which is provided on the side of the supply unit element 55 facing away from the free space 45. The supply connection 61 can be connected to the system connection 59 via the line 57. In this regard, the connection of the line 57 to the system connection 59 or to the supply unit element 55 is releasable so that the supply unit element 55 can be disconnected from the system connection 59 when it is to be removed from the through-opening 53.

The supply unit element 55 can thus be easily removed from the through-opening 53 and replaced, for example, with a simple cover element.

Furthermore, in the aircraft fuselage assembly 1 according to the invention, it is possible for a central cargo floor element 47, as shown in the exemplary embodiment in FIG. 2 and which does not have a through-opening 53, to be replaced by a central cargo floor element 47 of the exemplary embodiment according to FIG. 3 so that a supply unit element 55 can be received therein. Such replacement is readily possible because the central cargo floor element 47 has no function of maintaining the stability of the aircraft fuselage assembly 1.

Figure 4:
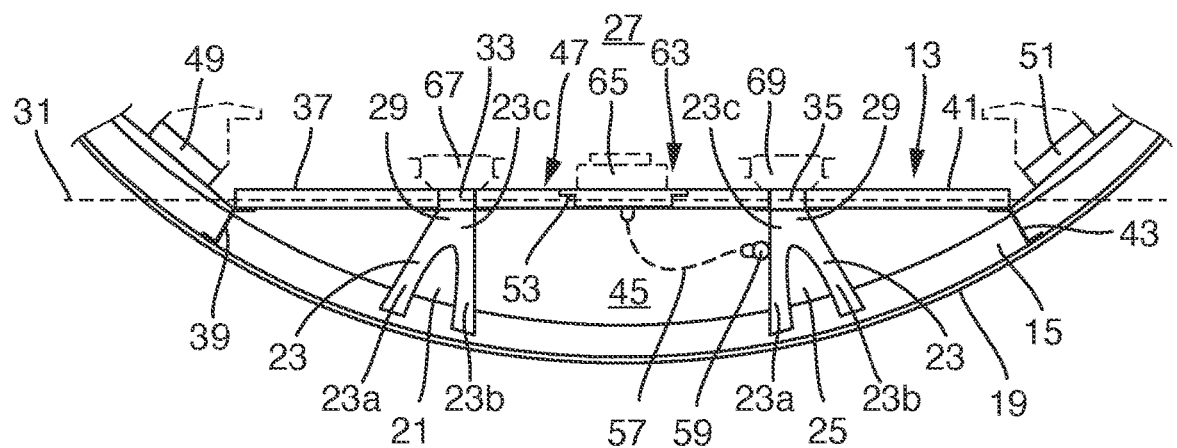
FIG. 4 shows an enlarged cross-sectional view of a third exemplary embodiment of an aircraft fuselage assembly according to the invention.

FIG. 4 shows a third exemplary embodiment of an aircraft fuselage assembly 1 according to the invention, which differs from the previously described exemplary embodiments in that at least one of the central cargo floor elements 47 is configured in such a way that, like the central cargo floor element 47 shown in FIG. 3, it has a through-opening 53, wherein, however, a conveyor unit element 63 is releasably inserted therein so that it closes the through-opening 53. However, also in the exemplary embodiment described here, the through-opening 53 does not extend over the entire length of the central cargo floor element 47 as seen in the direction of the longitudinal axis 3, but only over a portion thereof. The conveyor unit element 63 is in turn releasably connected via a line 57 to a system connection 59 in the free space 45, the system connection being attached to one of the support elements 23. Thus, the conveyor unit element 63 can also have a supply connection by means of which devices inside the cargo space 11 can be supplied. Furthermore, fastened to the conveyor unit element 63 is an engagement element assembly 65 designed to engage with a conveyor device for conveying cargo items, which is not shown in FIG. 4. The engagement element assembly 65 can also be formed by rail elements extending along the entire length of the cargo floor assembly 13. When the conveyor device is engaged with the engagement element assembly 65, it can move by means of a drive along the longitudinal axis 3 across the central cargo floor elements 47 with a conveyor unit element 63 in a through-opening 53.

In particular, it is possible for the supply unit element 55 shown in FIG. 3 and described in conjunction with the second exemplary embodiment to be substituted for the conveyor unit element 63, since in both cases the through-opening 53 in the central cargo floor element 47 is of the same dimensions.

In contrast to the second exemplary embodiment shown in FIG. 3, in the third exemplary embodiment shown in FIG. 4, a first and a second rail 67, 69 are provided, wherein the first rail 67 extends along the first beam 33 and has guide elements (not shown), for example in the form of rollers, so that cargo items can be moved along the first rail 67 without great resistance. Similarly, the second rail 69, which extends along the second beam 35, also has guide elements, preferably in the form of rollers.

Figure 5:
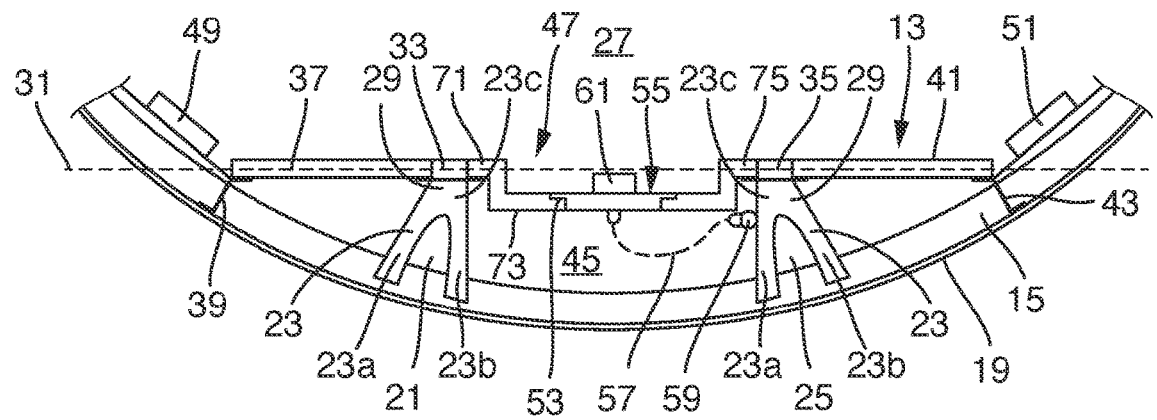
FIG. 5 shows an enlarged cross-sectional view of a fourth exemplary embodiment of an aircraft fuselage assembly according to the invention.

FIG. 5 shows a fourth exemplary embodiment of an aircraft fuselage assembly 1 according to the invention, wherein this fuselage assembly is quite similar in design to the exemplary embodiments described above and differs therefrom merely in that at least one of the central cargo floor elements 47 is configured as follows.

It has a first portion 71, a second portion 73, and a third portion 75. The surface of the first portion 71 and of the third portion 75 facing away from the primary structure and thus the free space 45 extends in the common plane 31, while the surface of the second portion 73 facing away from the primary structure and the free space 45 extends parallel to the common plane 31 but offset towards the primary structure and into the free space 45. Furthermore, the first portion 71 is releasably connected to the first support 33, while the third portion 75 is releasably connected to the second support 35. Thus, according to this exemplary embodiment, the central cargo floor element 47 is also again releasably connected to the free ends 29 of the support elements 23.

In addition, a through-opening 53 is again provided in the second portion 73 arranged centrally between the first and third portions 71, 75, in which through-opening in the exemplary embodiment shown here there is arranged a supply unit element 55 which closes the through-opening 53, wherein the supply unit element 65 is releasably connected to the second portion 73. However, also in this exemplary embodiment, the through-opening 53 does not extend over the entire length of the central cargo floor element 47 or the second portion 73, as seen in the direction of the longitudinal axis 3, but only over a part thereof. The supply unit element 55 is formed in the same way as already described in conjunction with FIG. 3, so that it has a supply connection 61 and is releasably connected to a system connection 59 in the free space 45 via a cable 57.

Figure 6:
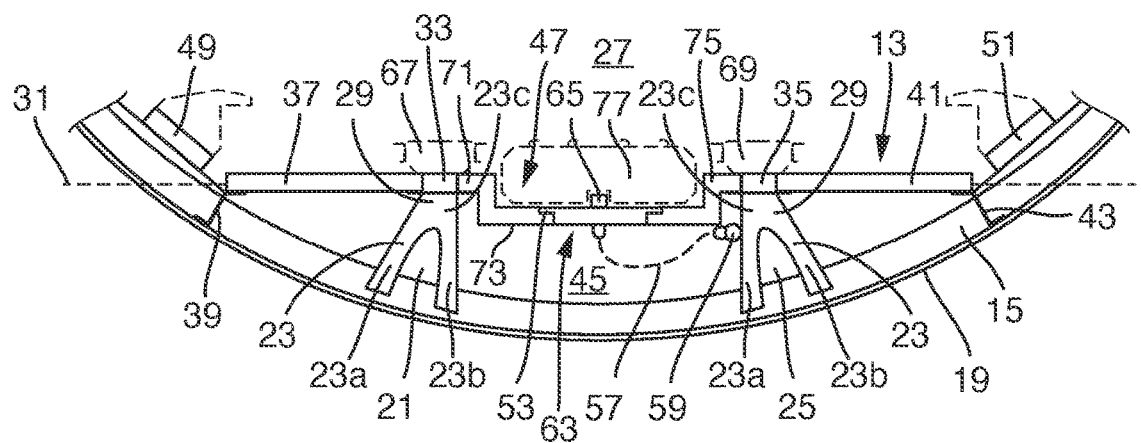
FIG. 6 shows an enlarged cross-sectional view of a fifth exemplary embodiment of an aircraft fuselage assembly according to the invention.

FIG. 6 shows a fifth exemplary embodiment of an aircraft fuselage assembly according to the invention, wherein this exemplary embodiment differs from the fourth exemplary embodiment shown in FIG. 5 in that, in the through-opening 53 of the central cargo floor element 47, provided here, as in FIG. 5, with three portions 71, 73, 75, instead of a supply unit element 55, there is provided a conveyor unit element 63, to which an engagement element assembly 65 is attached, which again may be formed by rail elements. In the exemplary embodiment shown here in FIG. 6, there is also provided a conveyor device 77 which, when engaged with the engagement element assembly 65, can move cargo items as it moves parallel to the longitudinal axis 3 along the central cargo floor elements 47 with the conveyor unit elements 63. Furthermore, in the fifth exemplary embodiment shown in FIG. 6, a first and a second rail 67, 69 are provided, wherein the first rail 67 extends along the first support 33 and has guide elements (not shown), for example in the form of rollers. In addition, a second rail 69 is also provided which extends along the second beam 35 and is formed in the same way as the first rail 67, so that the two rails 67, 69 allow cargo items to be moved by the conveyor device 77.

Also in the fifth exemplary embodiment shown in FIG. 6, the conveyor unit element 63 is releasably connected via a line 57 to a system connection 59, which is attached to a support element 23 of the second row 25, so that the conveyor unit element 63 can be supplied for example with electrical power via the system connection 59.

In all of the previously explained exemplary embodiments, the support elements 23 and the first and second cargo floor elements 37, 41 are designed and arranged such that loads emanating from the central cargo floor elements 47 are transferred from the support elements 23 and the first and second cargo floor elements 37, 41 into the primary structure in the form of the formers 15. This is achieved by the fact that then, considering the exemplary embodiments in the cross-sections shown in figures, the first line along which the free ends 29 of the support elements 23 of the first row 21 extend and along which the central cargo floor elements 47 are connected to the support elements 23, the line along which the first cargo floor elements 37 are connected to the formers 15, and the connection between the support elements 23 of the first row 21 and the frames form a first triangle. Quite analogously, the second line along which the free ends 29 of the support elements 23 of the second row 25 are arranged, the line along which the second cargo floor elements 41 are connected to formers 15, and the line along which the support elements 23 of the second row 25 are connected to the formers 15 also form a second triangle.

Starting from the first line forming the apex of the first triangle, load paths are provided through the first cargo floor elements 37 on the one hand and the support elements 23 of the first row 21 on the other hand and can be used to transfer loads to the cargo floor in the z- and y-directions and thus transversely to the longitudinal axis 3 of the fuselage assembly. If the central cargo floor elements 47 are releasably connected to the support elements 23 of the first row 21 along the first line, loads acting in the y- and z-directions on the central cargo items 47 are also transferred to the primary structure, formed by the formers 15, via the described first triangle.

A very analogous effect is achieved for the second triangle, in which the second cargo floor elements 41 and the support elements 23 of the second row 25 also form rigid load paths for loads in the y- and z-directions towards the primary structure, in the form of the formers 15, that emanate from the cargo floor elements 41, 47 and, in particular, the central cargo floor element or elements 47.

In addition, the fixed connection between the free ends 29 of the support elements 23 of the first row 21 along the first line and the first cargo floor elements 37, as well as the fixed connection between the first cargo floor elements 37 and the formers 15, ensures that loads acting on the central cargo floor elements 47 in the x-direction and thus in the longitudinal direction 3 of the aircraft fuselage assembly 1 can also be transferred to the formers 15.

The various fixed connections along the first line between the first cargo floor elements 37 and the free ends of the support elements 23 of the first row 21, between the first cargo floor elements 37 and the formers 15, and between the support elements 23 of the first row 21 and the formers 15 are set up and designed in such a way that they can also transmit the loads that occur in each case. The same applies to the fixed connections in the second triangle.

Since the loads emanating from the central cargo floor element 47 in the x-, y- and z-directions are introduced into the primary structure, in the form of the formers 15, via the described triangles, it is not necessary to provide a framework structure below the central cargo floor elements 47 to support loads, and in order to replace the central cargo floor elements 47 it is merely necessary to detach them from the free ends 29 of the support elements 23 of the first and second rows 21, 25 along the first and second lines. Further connections forming part of a load path need not be provided on the central cargo floor elements 47. This, in turn, results in the fact that it is possible to switch between the previously described exemplary embodiments in a simple manner and only the respective central cargo floor elements 47 need to be changed.

The various central cargo floor elements 47 explained in the previously described exemplary embodiments can be exchanged with one another, wherein such an exchange requires relatively little effort because the central cargo floor elements are releasably connected to the free ends 29 of the support elements 23 of the first and second rows 21, 25, as previously described.

It follows that an aircraft fuselage assembly 1 according to one of the exemplary embodiments shown can be converted in a simple manner into another of the exemplary embodiments shown. As a result, aircraft with a fuselage assembly 1 according to the invention can be used much more flexibly than is currently the case, since a conversion can be carried out in a short space of time. This is particularly the case because the central cargo floor elements 47 do not have a load-bearing function within the aircraft fuselage assembly and, in particular, are not part of the load-bearing primary structure.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 aircraft fuselage assembly
3 longitudinal axis
5 passenger cabin
7 baggage compartment
9 floor
11 cargo space
13 cargo floor assembly
15 formers
17 support element
19 outer skin
21 first row
23 support element
23a first support element portion
23b second support element portion
23c connection portion
25 second row
27 interior space
29 free end
31 common plane
33 first beam
35 second beam
37 first cargo floor element
39 first fastening element
41 second cargo floor elements
43 second fastening elements
45 free space
47 central cargo floor element
49 first fastening element
51 second fastening element
52, 52' adapter plate
53 through-opening
55 supply unit element
57 line
59 system connection
61 supply connection
63 conveyor unit element
65 engagement element assembly
67 first rail
69 second rail
71 first portion
73 second portion
75 third portion
77 conveyor device

The invention claimed is:

1. An aircraft fuselage assembly extending along a longitudinal axis and comprising:
   a primary structure supporting an outer skin of the fuselage assembly, wherein the outer skin surrounds an interior space of the aircraft fuselage assembly and the primary structure is arranged on a side of the outer skin facing the interior space,
   a first and second row of support elements, wherein the first and second rows extend parallel to the longitudinal axis,
   wherein the support elements are connected to the primary structure and extend away from the outer skin into the interior space, wherein they have a free end remote from the outer skin,
   wherein the free ends of the support elements of the first row extend along a first line and the free ends of the support elements of the second row extend along a second line, wherein the first and second lines are spaced apart from each other,
   wherein the free ends of the support elements are arranged in a common plane which runs horizontally through first and second lateral portions of the primary structure located on opposite sides of the longitudinal axis when an aircraft having the aircraft fuselage assembly is arranged with its landing gear on a landing or taxing surface,
   wherein a free space is formed between the first row and the second row of support elements below the common plane and extends up to the primary structure so that the free space is free of the primary structure supporting the outer skin,
   a cargo floor assembly forming a cargo floor within the interior space,
   wherein the cargo floor assembly has at least one first cargo floor element extending from the first line in the common plane laterally in relation to the longitudinal axis towards the primary structure and being fixedly connected thereto at the first lateral portion of the primary structure and to the support elements of the first row,
   wherein the cargo floor assembly has at least one second cargo floor element extending from the second line in the common plane laterally in relation to the longitudinal axis towards the primary structure and being fixedly connected thereto at the second lateral portion of the primary structure and to the support elements of the second row, and
   wherein at least one central cargo floor element is provided, which is arranged between the first and second lines and is releasably connected to the support elements of the first and second rows,
   wherein the support elements and the at least one first and the at least one second cargo floor elements are configured and arranged such that loads emanating from the central cargo floor element are transferred into the primary structure by the support elements and the at least one first and the at least one second cargo floor elements, and
   wherein the at least one central cargo floor element can be removed without affecting a stability of the aircraft fuselage assembly, and
   wherein the free space between the first row and the second row of support elements is free from horizontally extending parts of the primary structure from the common plane to portions of the primary structure to which the support elements are attached.

2. The aircraft fuselage assembly as claimed in claim 1, wherein a plurality of central cargo floor elements are provided, arranged successively along the longitudinal axis between the first and second lines and releasably connected to support elements of the first and second rows.

3. The aircraft fuselage assembly as claimed in claim 1, wherein at least one of
- a plurality of first cargo floor elements are provided, which are arranged successively along the longitudinal axis in the common plane, which extend from the first line in the common plane towards the primary structure and are fixedly connected thereto and to the support elements of the first row, or
- a plurality of second cargo floor elements are provided, which are arranged successively along the longitudinal axis in the common plane, which extend from the second line in the common plane towards the primary structure and are fixedly connected thereto and to the support elements of the second row.

4. The aircraft fuselage assembly as claimed in claim 1, wherein each of the support elements has a first support element portion, a second support element portion and a connecting portion,
wherein the free end of each of the support elements is provided at the connecting portion,
wherein each support element has the support element portions extending away from the connecting portion and running, spaced apart from each other, to the primary structure, so that they are connected to the primary structure in a manner spaced apart from each other in a circumferential direction about the longitudinal axis.

5. The aircraft fuselage assembly as claimed in claim 1, wherein at least one of
- a continuous first beam is provided along the first row and is connected to the free ends of the support elements of the first row, with the at least one first cargo floor element being fixedly connected to said first beam, or
- wherein a continuous second beam is provided along the second row and is connected to the free ends of the support elements of the second row, with at the least one second cargo floor element being fixedly connected to said second beam.

6. The aircraft fuselage assembly as claimed in claim 1, wherein the free ends of the support elements of the first row are provided with first adapter plates extending parallel to the common plane, and
wherein each of the first adapter plates is fixedly connected to the at least one first cargo floor element,
wherein the free ends of the support elements of the second row are provided with second adapter plates extending parallel to the common plane,
wherein each of the second adapter plates is fixedly connected to the at least one second cargo floor element, and
wherein the first and second adapter plates have connection elements configured to be releasably connected to the at least one central cargo floor element.

7. The aircraft fuselage assembly as claimed in claim 1, wherein the at least one central cargo floor element has a through-opening,
wherein a cover element is provided that is insertable into the through-opening to close the through-opening, wherein the cover element is releasably connectable to the at least one central cargo floor element.

8. The aircraft fuselage assembly as claimed in claim 7, wherein the at least one central cargo floor element has a first portion, a second portion, and a third portion,
wherein a surface of the first portion and of the third portion facing away from the primary structure run in a common plane when the central cargo floor element is assembled,
wherein a surface of the second portion facing away from the primary structure runs parallel to the common plane and offset towards the primary structure in an assembled state of the central cargo floor element,
wherein the through-opening is arranged in the second portion, and
wherein the first portion is releasably connected to support elements of the first row, and the third portion is releasably connected to support elements of the second row.

9. The aircraft fuselage assembly as claimed in claim 7, wherein a supply unit element with one or more supply connections is provided,
wherein the supply unit element functions as the cover and is insertable into the through-opening to close the through-opening,
wherein the supply unit element is releasably connectable to the at least one central cargo floor element, and
wherein, when the supply unit element is inserted into the through-opening, the supply connections are arranged on the side of the supply unit element facing away from the primary structure.

10. The aircraft fuselage assembly as claimed in claim 7, wherein at least one conveyor unit element is provided, to which an engagement element assembly is attached, which is configured to be engaged by a conveyor device for conveying cargo items,
wherein the conveyor unit element is insertable into the through-opening for closing the through-opening,
wherein the conveyor unit element is releasably connectable to the at least one central cargo floor element, and
wherein, when said conveyor unit element is inserted into said through-opening, the engagement element assembly is arranged on the side of the conveyor unit element facing away from the primary structure.

11. The aircraft fuselage assembly as claimed in claim 10, wherein a conveyor device is provided which is configured, when the conveyor unit element is inserted into the through-opening, to engage with the engagement element assembly and to convey cargo items along the longitudinal axis.

12. The aircraft fuselage assembly as claimed in claim 1, wherein first engagement elements for engagement with cargo items are fastened to the primary structure on the side of the at least one first cargo floor element facing away from the first line,
wherein second engagement elements for engagement with cargo items are fastened to the primary structure on the side of the at least one second cargo floor element facing away from the second line.

13. The aircraft fuselage assembly as claimed in claim 10, wherein a first rail is provided along the first row and is provided with guide elements for cargo items, and
wherein a second rail is provided along the second row and is provided with guide elements for cargo items.

* * * * *